(12) United States Patent
Srinivasan et al.

(10) Patent No.: US 7,890,529 B1
(45) Date of Patent: Feb. 15, 2011

(54) DELEGATIONS AND CACHING IN A DISTRIBUTED SEGMENTED FILE SYSTEM

(75) Inventors: Sudhir Srinivasan, Chelmsford, MA (US); Boris Zuckerman, Marblehead, MA (US); Irina P. Slutsky, Andover, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 257 days.

(21) Appl. No.: 11/676,136

(22) Filed: Feb. 16, 2007

Related U.S. Application Data

(63) Continuation of application No. 10/833,923, filed on Apr. 28, 2004, now abandoned.

(60) Provisional application No. 60/465,894, filed on Apr. 28, 2003.

(51) Int. Cl.
*G06F 17/30* (2006.01)

(52) U.S. Cl. ..................................... 707/781

(58) Field of Classification Search ......... 707/781–788, 707/821–827; 709/219
See application file for complete search history.

(56) References Cited

U.S. PATENT DOCUMENTS

| | | | | |
|---|---|---|---|---|
| 5,202,971 | A * | 4/1993 | Henson et al. .................. | 707/8 |
| 5,721,916 | A | 2/1998 | Pardikar | |
| 5,765,151 | A | 6/1998 | Senator | |
| 6,105,027 | A * | 8/2000 | Schneider et al. .............. | 707/9 |
| 6,134,594 | A | 10/2000 | Helland | |
| 6,173,293 | B1 * | 1/2001 | Thekkath et al. ............ | 707/201 |
| 6,185,575 | B1 | 2/2001 | Orcutt | |
| 6,453,319 | B1 | 9/2002 | Mattis et al. | |
| 6,697,846 | B1 * | 2/2004 | Soltis ......................... | 709/217 |
| 6,782,389 | B1 | 8/2004 | Chrin et al. | |
| 6,856,755 | B1 | 2/2005 | Lin et al. | |
| 6,871,346 | B1 * | 3/2005 | Kumbalimutt et al. ....... | 718/104 |
| 7,103,915 | B2 * | 9/2006 | Redlich et al. ................. | 726/27 |
| 2002/0015042 | A1 * | 2/2002 | Robotham et al. .......... | 345/581 |
| 2002/0032691 | A1 * | 3/2002 | Rabii et al. .................. | 707/200 |
| 2002/0091975 | A1 * | 7/2002 | Redlich et al. .............. | 714/699 |
| 2002/0196744 | A1 | 12/2002 | O'Connor | |
| 2003/0097454 | A1 | 5/2003 | Yamakawa et al. | |
| 2003/0126265 | A1 | 7/2003 | Aziz et al. | |
| 2003/0126266 | A1 * | 7/2003 | Peles .......................... | 709/228 |
| 2004/0088376 | A1 * | 5/2004 | McCanne et al. ........... | 709/219 |
| 2004/0267832 | A1 | 12/2004 | Wong et al. | |
| 2005/0097298 | A1 | 5/2005 | Cohen | |
| 2005/0144178 | A1 | 6/2005 | Chrin et al. | |

* cited by examiner

*Primary Examiner*—Wilson Lee

(57) ABSTRACT

A system for implementing a distributed, segmented file system includes file servers that each are configured to control separate segments of the distributed-file system, the file servers including: a memory interface configured to communicate with a memory storing at least one of the segments of the distributed file system; a communication interface coupled to at least another of the file servers; and a processor coupled to the memory interface and the communication interface and configured to control, read, and write to file system objects stored in the memory. The system further includes means for transferring permission for access to a requested file system object from an owner server currently controlling a segment where a requested object resides to an access-requesting server.

20 Claims, 9 Drawing Sheets

| SEGMENT # TO FILE SERVER (e.g., IP) ADDRESS MAP | | |
|---|---|---|
| SEGMENT NUMBER RANGE | MASK | (PARTIAL) SERVER LOCATION |
| SEGMENT NUMBER RANGE | MASK | (PARTIAL) SERVER LOCATION |
| 412 | 414 | 416 |
| ... | ... | ... |
| 422 | | |
| SEGMENT # | MASK | (PARTIAL) SERVER LOCATION |
| SEGMENT # | MASK | (PARTIAL) SERVER LOCATION |

… # DELEGATIONS AND CACHING IN A DISTRIBUTED SEGMENTED FILE SYSTEM

CROSS-REFERENCE TO RELATED ACTIONS

This application is a continuation of and claims priority to U.S. application Ser. No. 10/833,923, filed Apr. 28, 2004 now abandoned, which is incorporated by reference herein in its entirety. This application claims the benefit of U.S. Provisional Application No. 60/465,894 filed Apr. 28, 2003.

FIELD OF THE INVENTION

The invention relates to computer storage and file systems and more specifically to techniques for delegating and caching control and locks over objects in a distributed segmented storage system.

BACKGROUND OF THE INVENTION

Data generated by, and used by, computers are often stored in file systems. File system designs have evolved over approximately the last two decades from server-centric models (that can be thought of as local file systems) to storage-centric models (that can be thought of as networked file systems).

Stand-alone personal computers exemplify a server-centric model—storage has resided on the personal computer itself, initially using hard disk storage, and more recently, optical storage. As local area networks ("LANs") became popular, networked computers could store and share data on a so-called file server on the LAN. Storage associated with a given file server is commonly referred to as server attached storage ("SAS"). Storage could be increased by adding disk space to a file server. SASs are expandable internally and there is no transparent data sharing between file servers. Further, with SASs throughput is governed by the speed of a fixed number of busses internal to the file server. Accordingly, SASs also exemplify a server-centric model.

As networks have become more common, and as network speed and reliability increased, network attached storage ("NAS") has become popular. NASs are easy to install and each NAS, individually, is relatively easy to maintain. In a NAS, a file system on the server is accessible from a client via a network file system protocol like NFS or CIFS.

Network file systems like NFS and CIFS are layered protocols that allow a client to request a particular file from a pre-designated server. The client's operating system translates a file access request to the NFS or DFS format and forwards it to the server. The server processes the request and in turn translates it to a local file system call that accesses the information on magnetic disks or other storage media. Using this technology, a file system can expand to the limits of an NAS machine. Typically no more than a few NAS units and no more than a few file systems are administered and maintained. In this regard, NASs can be thought of as a server-centric file system model.

Storage area networks (SANs) (and clustered file systems) exemplify a storage-centric file system model. SANs provide a simple technology for managing a cluster or group of disk-storage units, effectively pooling such units. SANs use a front-end system, that can be a NAS or a traditional server. SANs are (i) easy to expand, (ii) permit centralized management and administration of the pool of disk storage units, and (iii) allow the pool of disk storage units to be shared among a set of front-end server systems. Moreover, SANs enable various data protection/availability functions such as multi-unit mirroring with failover for example. SANs, however, are expensive and while they permit space to be shared among front-end server systems, they do not permit multiple SANs environments to use the same file system. Thus, although SANs pool storage, they basically behave as a server-centric file system. That is, a SAN behaves like a fancy (e.g., with advanced data protection and availability functions) disk drive on a system. Also, various incompatible versions of SANs have emerged.

SUMMARY OF THE INVENTION

Embodiments of the invention provide techniques for producing general delegations of objects owned by given servers to one or more of a plurality of servers involved in the segmented file system. The invention provides a general service for delegating control and locks and enabling caching of a variety of objects including, but not limited to, files, byte-ranges, segments. The delegations themselves can be used to identify the objects that they control or protect or with which they are otherwise involved. Delegations are also used to recover the state of protected objects in cases such as network disconnections, and other failures. Other embodiments are within the scope and spirit of the invention.

In general, in an aspect, the invention provides a system for implementing a distributed, segmented file system, the system comprising file servers that each are configured to control separate segments of the distributed-file system, the file servers comprising a memory interface configured to communicate with a memory storing at least one of the segments of the distributed file system, a communication interface coupled to at least another of the file servers, and a processor coupled to the memory interface and the communication interface and configured to control, read, and write to file system objects stored in the memory. The system further includes means for transferring permission for access to a requested file system object from an owner server currently controlling a segment where a requested object resides to an access-requesting server.

Implementations of the invention may include one or more of the following features. The transferring means is configured to provide an indication related to an identity of the requested file system object. The servers are configured to determine from the indication a current state of access permission of the requested file system object. The current state includes a current file server that has control of the requested file system object. The file system object is one of a file and a byte range. The owner server currently controlling the segment where the requested object resides and the access-requesting server as the same server. The means for transferring permissions is configured to transfer permissions without affecting the physical file system.

Embodiments of the invention may provide one or more of the following capabilities. Cache coherence can be provided and consistency maintained. Delegation of access control and cache control can be regulated. Control over file system objects that reside on segments of a segmented file system, and locks, may be delegated and caching enabled to at least one of a plurality of servers at a logical layer above that of the structure of the physical file system. In this invention, the structure of such delegations is general and applied to such objects as byte-ranges of files, files, segments, application locks (F-locks), and so on. Permissions can be transferred permissions without affecting a physical layer of a system.

BRIEF DESCRIPTION OF THE FIGURES

FIG. 4 is a block diagram of an exemplary table data structure that may be used to map segment numbers to identifiers of file servers storing the segments.

DETAILED DESCRIPTION OF PREFERRED EMBODIMENTS

Figure 1:
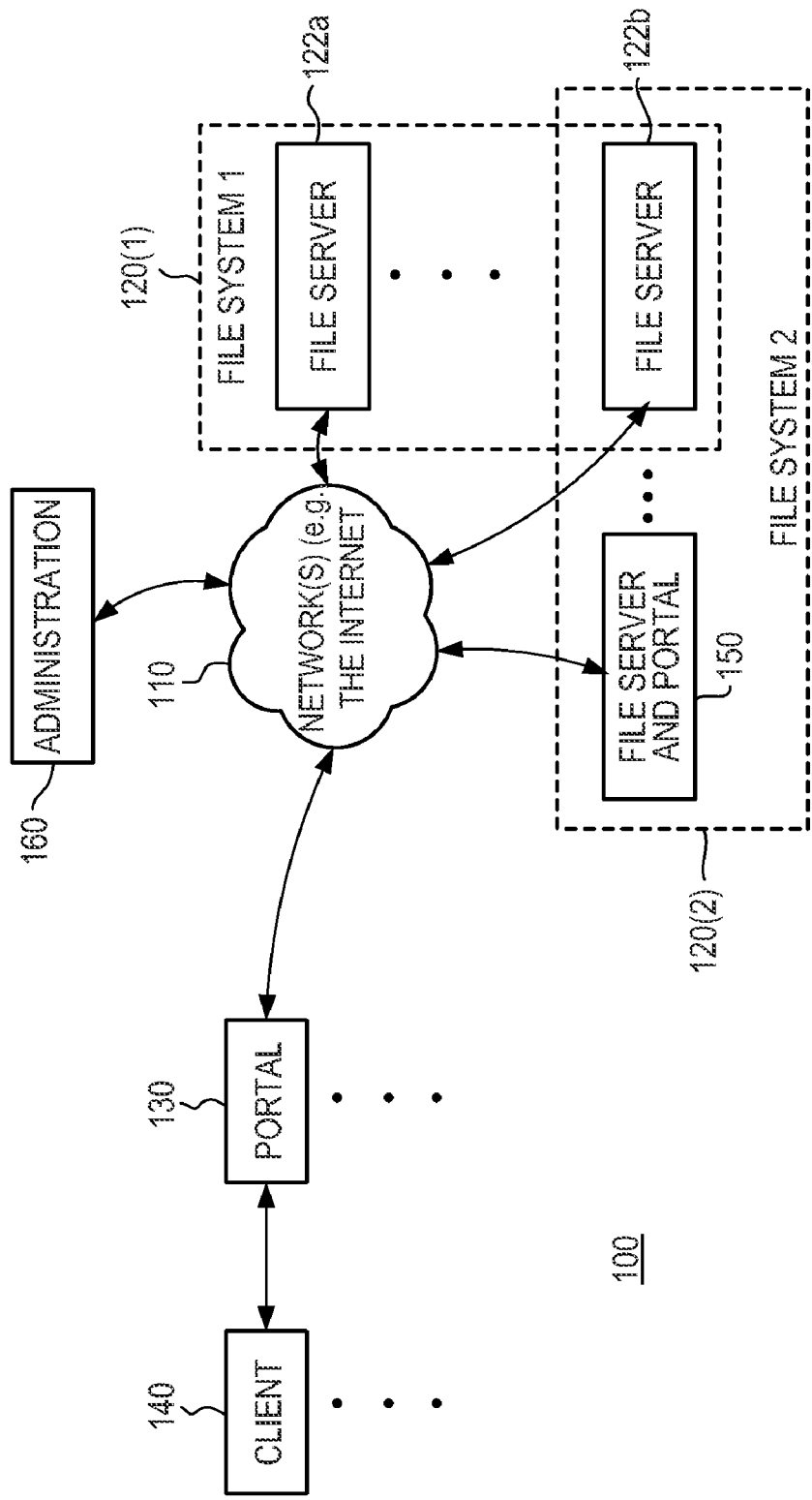
FIG. 1 is a block diagram of a data storage and access system.

FIG. 1 is a block diagram of an exemplary environment 100 in which embodiments of the invention may be used. The exemplary environment 100 includes one or more clients 140, one or more portals (entry point servers—"ES") 130, a network 110, an administration unit 160, and two file systems 120(1), 120(2). The network 110 may be, e.g., an Internet protocol ("IP") based network. The file systems 120(1), 120(2) include multiple file servers 122, 150, with the file server 150 being a combined file server and portal unit. As illustrated, a single file server 122b may belong to/support more than one file system. The one or more portal units 130 permit the one or more clients 140 to use the file systems 120. The clients 140 may or may not be provided with special front-end software or application. From the perspective of the client(s) 140, the file systems 120(1), 120(2) are a virtual single storage device residing on the portal(s) 130. The administration unit 160 is configured to control the file servers 122 and portals 130, and combination 150, and is centralized. Administrative information may be collected from the units 122, 130, 150 and distributed to such units 122, 130, 150 in a point-to-point or hierarchical manner by the administrator 160. Devices used in the environment 100 can be computing devices including processors and software code such that the processors can execute the code to perform functions as described. The devices include other hardware such as busses and communications interfaces as appropriate.

Figure 2:
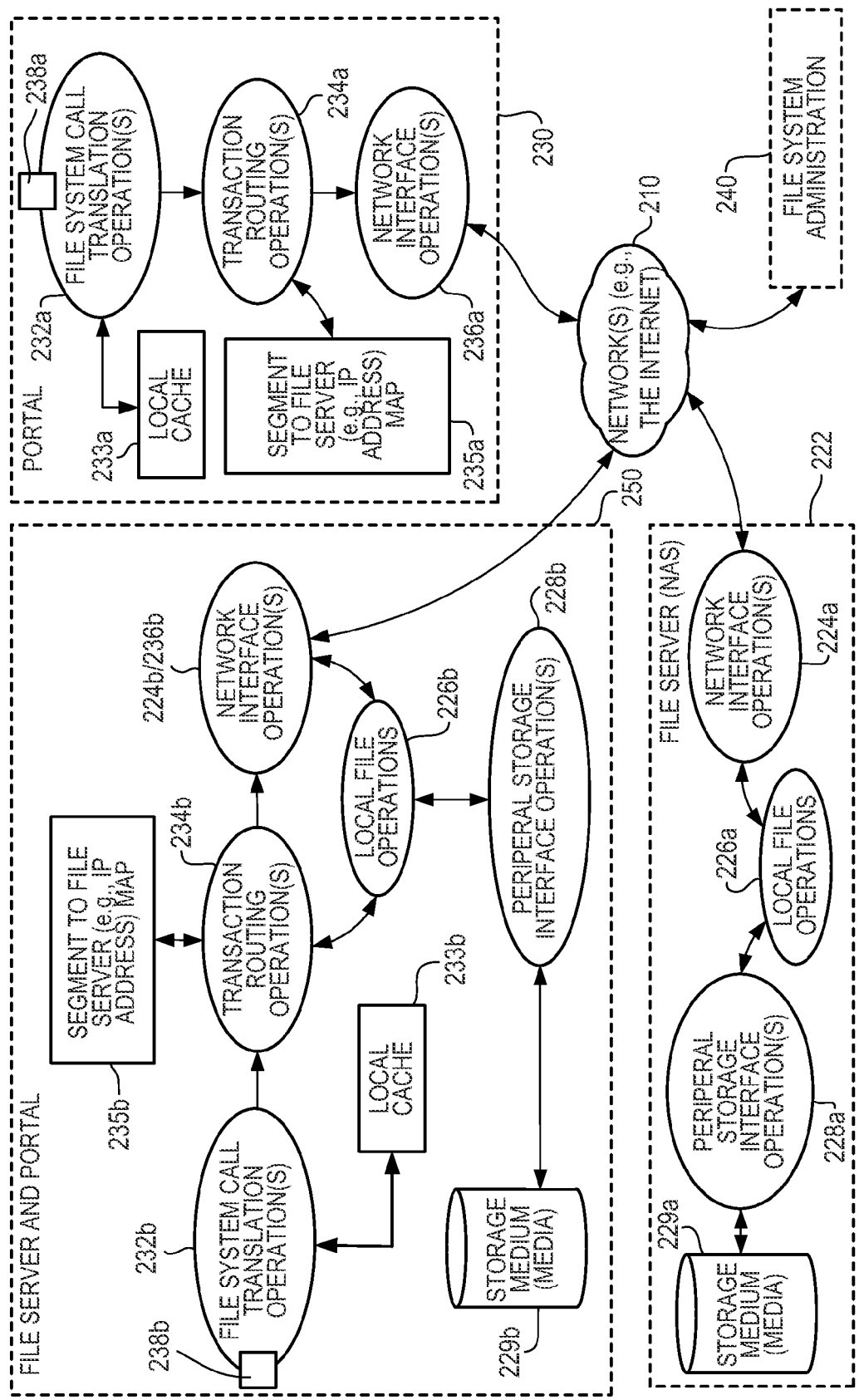
FIG. 2 is a process bubble diagram of operations that may be carried out by various exemplary apparatus used in the system shown in FIG. 1.

Referring to FIG. 2, a file server and portal combination 250, a portal 230, and a filer server 222 are configured to perform the operations shown. Each of these units 250, 230, 222 may be coupled to a network 210 that facilitates communications among the units 250, 230, 222. More than one network may be used even though only the network 210 is shown. A file system administration unit 240 is also coupled to the network 210. The administration unit 240 is configured to gather information about the components 250, 230, 222, and to disseminate system control information (e.g., supporting portal functions) to the components 250, 230, 222 through the network 210.

The file server 222 is configured to perform file access, storage, and network access operations as indicated by various operations modules. The file server 222 can perform local file operations 226a including reading and writing files, inserting and deleting directory entries, locking, etc. As part of the local file operations 226a, the server 222 can translate given requests into input/output ("I/O") requests that are submitted to a peripheral storage interface operations 228a module. The peripheral storage interface operations 228a process the I/O requests to a local storage sub-system 229a. The storage sub-system 229a can be used to store data such as files. The peripheral storage interface operations 228a is configured to provide data transfer capability, error recovery and status updates. The peripheral storage interface operations 228a may involve various types of protocols for communication with the storage sub-system 229a, such as a network protocol. File operation requests access the local file operations 226a, and responses to such requests are provided to the network 210, via a network interface operations module 224a. The modules shown in FIG. 2 may be separate entities, or may be combined, e.g., as part of a set of computer-readable, computer-executable program instructions.

The portal 230 includes various modules for translating calls, routing, and relating file system segments and servers. A client (user) can access the portal 230 via an access point 238a in a file system call translation operations module 232a. One way for this entry is through a system call, which will typically be operating-system specific and file-system related. The file system call translation operations 232a can convert a file system request to one or more atomic file operations, where an atomic file operation accesses or modifies a file system object. Such atomic file operations may be expressed as commands contained in a transaction object. If the system call includes a file identifier (e.g., an Inode number), the file system call translation operations 232a may determine a physical part of a storage medium of the file system corresponding to the transaction (e.g., a segment number) from a (globally/file-system wide) unique file identifier (e.g., Inode number). The file system call translation operations 232a may include a single stage or multiple stages. This translation operations 232a may also contain local cache 233a. This local cache 233a preferably includes a local data cache, a cache of file locks and other information that may be frequently used by a client, or by a program servicing a client. If a request cannot be satisfied using local cache 233a, the file system translation operations 232a may forward the transaction object containing atomic file operation commands to the transaction routing operations 234a. Similar functionality is provided in, and similar operations may be performed by, the combined portal and file server 250.

The transaction routing operations 234a, 234b use the file identifier to determine the location (e.g., the IP address) of a file server 222/250 that is in charge of the uniquely identified file/directory. This file server can be local (i.e., for the unit 250 acting as both a portal and a file server, that received the request) or remote. If this file server is local, the transaction routing operations 234b pass the file operation to the local file operations 226b that, in turn, pass an appropriate command to the peripheral storage interface operations 228b for accessing the storage medium 229b. If, on the other hand, the file server is remote, the network 210 is used to communicate this operation. The routing operations 234 may use the file identifier to derive a corresponding segment number to determine the location of the file/directory. The system is preferably independent of any particular networking hardware, protocols or software. Networking requests are handed over to a network interface operations 224b, 236b.

The network interface operations 224/236 service networking requests regardless of the underlying hardware or protocol, and forward the transaction toward the appropriate file server 222, 250 (i.e., that controls a particular file system segment associated with the request). The network interface operations 224/236 may provide data transfer, error recovery and status updates on the network 210.

Figure 3:
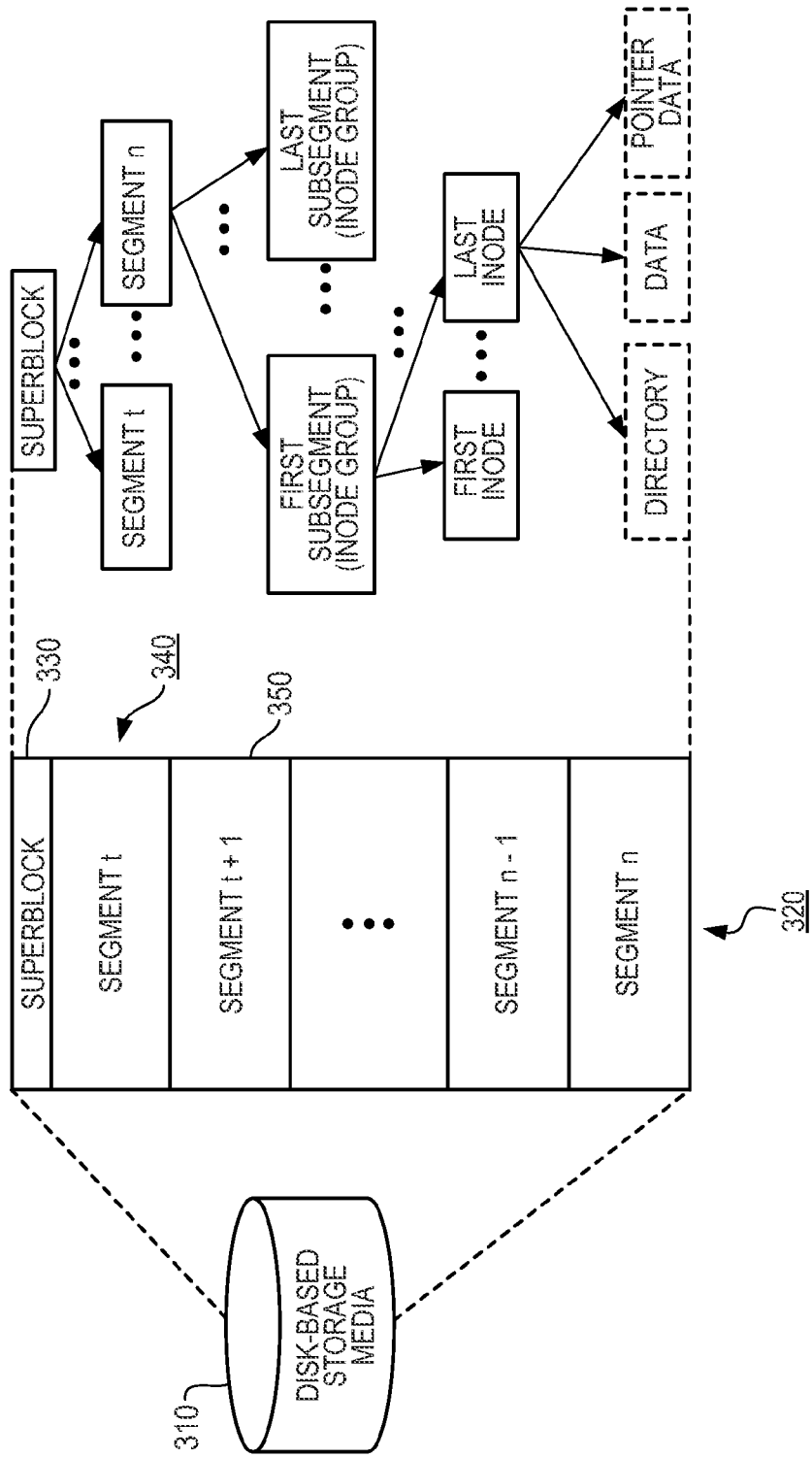
FIG. 3 is a block diagram of an exemplary data structure of a storage medium, such as a disk-based storage medium.

Referring to FIG. 3, a virtual storage 310 is provided that stores file system data. The storage 310 is a logical volume of storage and as shown may be a disk-based storage, although this is not required. A logical volume manager (LVM) aggregates the storage.

The virtual storage 310 uses storage system segments 340 for storing data. The segment 340 is a logical portion of storage (e.g., of a disk or other storage medium). The actual sizes of segments can vary from storage medium to storage medium.

To determine what each segment contains, a superblock 330 include a file system id, segment number, and other information identifying the file system and the file system state.

In the file system, a file or Inode stored on a disk may be addressed by (i) a segment number, and (ii) a block number within the segment. The translation of this address to a physical disk address occurs at (or by) the lowest level (the SFSSFS (Segmented File System) Physical System in FIG. 6 below), by the peripheral storage interface operations (e.g., thread) 228 of the appropriate file server 222/250.

This convention also makes it simple to distribute the file system over multiple servers as well using a map of which segments of the file system reside on which host file server. More specifically, once the segment number is derived from the FID, the appropriate file server can be determined by mapping, such as through a routing table. For example, this map may be a table that lists the file servers (on which the local agents execute) corresponding to particular segments. The file server may be identified by its IP address. Referring to FIG. 4, the segment to file server map 235a includes segment number ranges 412, segment numbers 422, masks 414, and (partial) server locations 416. The map 235a indicates that if a segment number (or a part thereof not masked out by a mask 414) matches one of the stored segment numbers 422, or falls within one of the ranges 412 of segment numbers, then the appropriate file server location, or partial file server location, 416 can be determined. Such a table may be manually or automatically populated (e.g., using file system administration 240 shown in FIG. 2) in a variety of ways. For example, associations of segment numbers and file servers (addresses) can be manually tracked, and provisioned manually, by some global administrative authority.

File servers may be organized in groups, such as in a hierarchy or some other logical topology, and the lookup of a server may use communication over the network 210 with a group leader or a node in a hierarchy. Such information may be cached on a leased basis with registration for notification on changes to maintain coherency. The local file operations 226 and peripheral storage operations 228 at the determined file server can determine the file to which an operation pertains. Once the request has been satisfied at the determined file server, the result is sent back to the original (portal) server (which may be the same as the determined file server). The original (portal) server may return the result to the requesting client.

Each (globally) unique FID may reside in a segment referred to as the "controlling segment" for that FID. The FID, e.g., an Inode, is associated with a file and encloses information, metadata, about the file (e.g., owner, permissions, length, type, access and modification times, location on disk, link count, etc.), but not the actual data. The data associated with an Inode may reside on another segment (i.e., outside the controlling segment of the Inode). The controlling segment of a particular Inode, however, and the segment(s) containing the data associated with the particular Inode, will be addressable and accessible by the controlling file server.

At any time, a segment is preferably under the control of at most one local agent (i.e., residing on the local file server). That agent is responsible for carrying out file system operations for any FID controlled by that segment. The controlling segment's unique identifier ("SID") for each FID is computable from the FID by the translator using information available locally (e.g., in the superblock 330). The controlling SID may, for example, be computed via integer division of the FID by a system constant, which implies a fixed maximum number of files controlled per segment. Other techniques/algorithms may be used.

Data from a file may be contained in a segment in the maximal segment group that is not under the control of the file server responsible for the controlling segment. In this case, adding space to or deleting space from the file in that segment may be coordinated with the file server responsible for it. Preferably no coordination is necessary for simple read accesses to the blocks of the file.

Client (user) entry and access to the file system may thus occur through any unit that has translation and routing operations, and that has access to a segment location map. Such units may be referred to as "portals." The file system preferably has multiple simultaneous access points into the system. A portal unit may not need file system call translator operations 232 if such operations are provided on the client (end user) machines.

Figure 5:
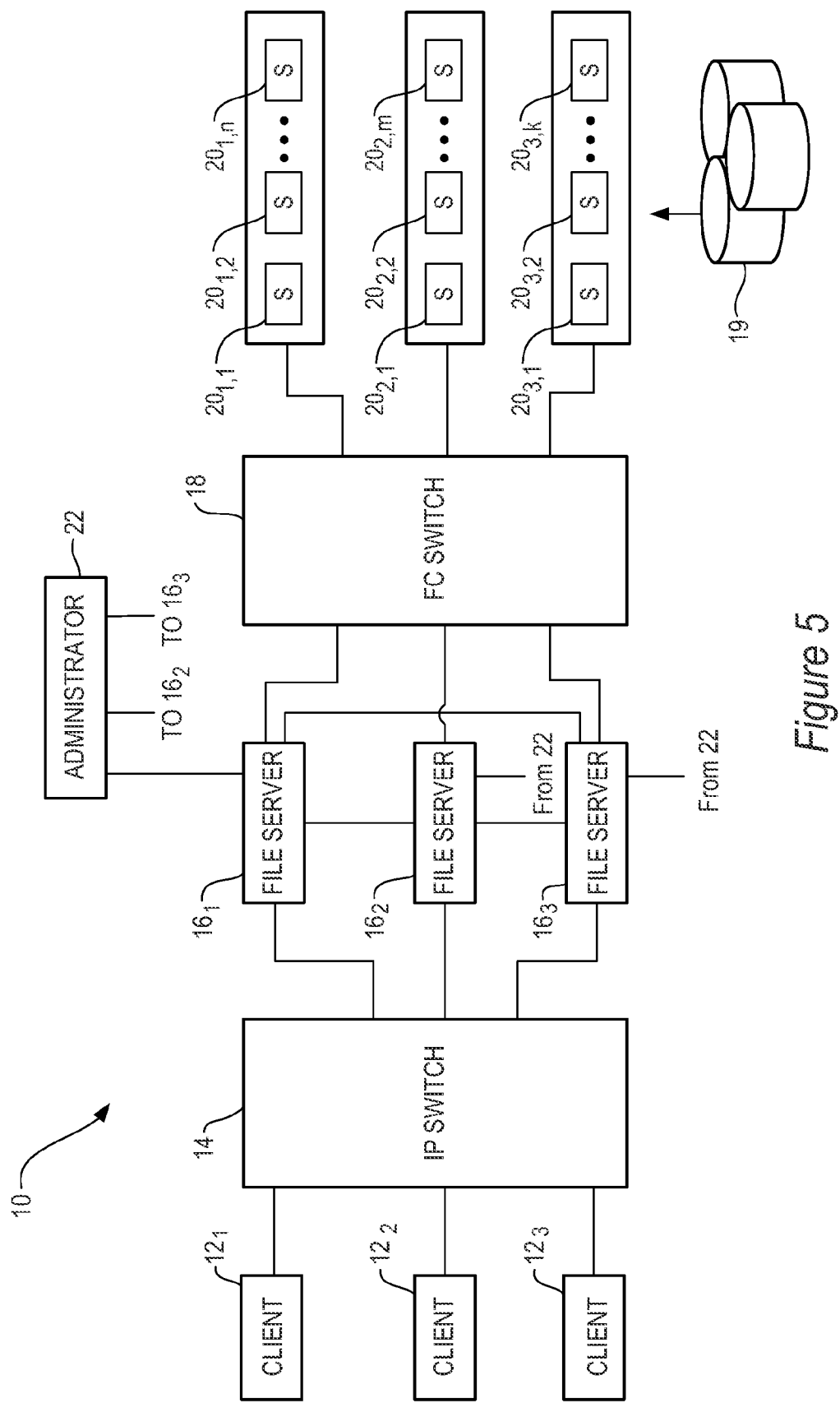
FIG. 5 is a simplified block diagram of a distributed-file system.

Referring to FIG. 5, a data storage and access system 10 comprises clients $12'$-$12_3$, an IP switch 14, file servers $16_1$-$16_3$, a fibre channel (FC) switch 18, storage 19, and an administrator 22. Although three clients 12 and three file servers 16 are shown, other numbers of these devices/systems may be used, and the quantities of the items need not be the same. Further, while only one IP switch 14 is shown, more than one IP switch may be used. The storage 19 can be any of a variety of physical media, such as disks, and provides a virtualized file system. Segments are typically incomplete portions of the file system in that they may refer to file system entities in other segments. For example, a directory/folder of files in the segment $20_{1,3}$ can refer to other segments 20, e.g., the segment $20_{2,1}$ and/or the segment $20_{3,2}$ with addresses in these other segments $20_{2,1}$, $20_{3,2}$ where the corresponding files are stored. A group of the segments 20 is associated with, and controlled by, a corresponding one of the servers 16. For example, the segments $20_{1,x}$ are associated with and controlled by the server $16_1$, etc. The servers 16 control the segments 20 in that the servers 16 arbitrate access to the segments 20, in particular modifying metadata including allocating file system blocks, modifying directories, etc. The file servers 16 can be any device or portion of a device that controls segment access. The system 10 provides a distributed file system in that the segments 20 of the file system are dispersed across the storage 19 such that it is not required that the file system be controlled by one server 16 and allows for a plurality of servers 16 to simultaneously control portions of the file system. The clients 12 and the IP switch 14, the IP switch 14 and the file servers 16, the file servers 16 and the FC switch 18, and the FC switch 18 and the storage 19 are configured and coupled for bi-directional communication. Transmission apparatus other than the FC switch 18 would be acceptable, such as an iSCSI device or any of numerous high-speed interconnects available now or in the future. The file servers 16 may also be directly connected to the segments 20. Further, the file servers 16 are configured and coupled for bi-directional communication with each other and with the administrator 22.

Any of the file servers 16 may be general computing devices, such as personal computers, workstations, etc. As such, the file servers 16 can include processors and memories that store software instructions that are executable by the processors for performing described functions. The file servers 16 may have their own local storage instead of or in addition to the storage 19 and can control/manage segments of a file system on their local storage. The file servers 16 may be clustered to work on a common issue and the clustered servers 16 may be managed/regulated in accordance with the invention.

The file servers 16 can assign FIDs and allocate memory for write requests to the segments 20 that the servers 16 control. Each of the servers 16 can pre-allocate an amount of memory for an incoming write request. The amount of pre-allocated memory can be adjusted and is preferably a fixed parameter that is allocated without regard, or even knowledge, of a quantity of data (e.g., a size of a file) to be written. If the pre-allocated memory is used up and more is desired, then the server 16 can pre-allocate another portion of memory. The server 16 that controls the segment 20 to be written to will allocate an FID (e.g., an Inode number). The controlling server 16 can supply/assign the Inode number and the Inode, complete with storage block addresses. If not all of the pre-allocated block addresses are used by the write, then the writing server 16 will notify the controlling server 16 of the unused blocks, and the controlling server 16 can de-allocate the unused blocks and reuse them for future write operations.

Figure 6:
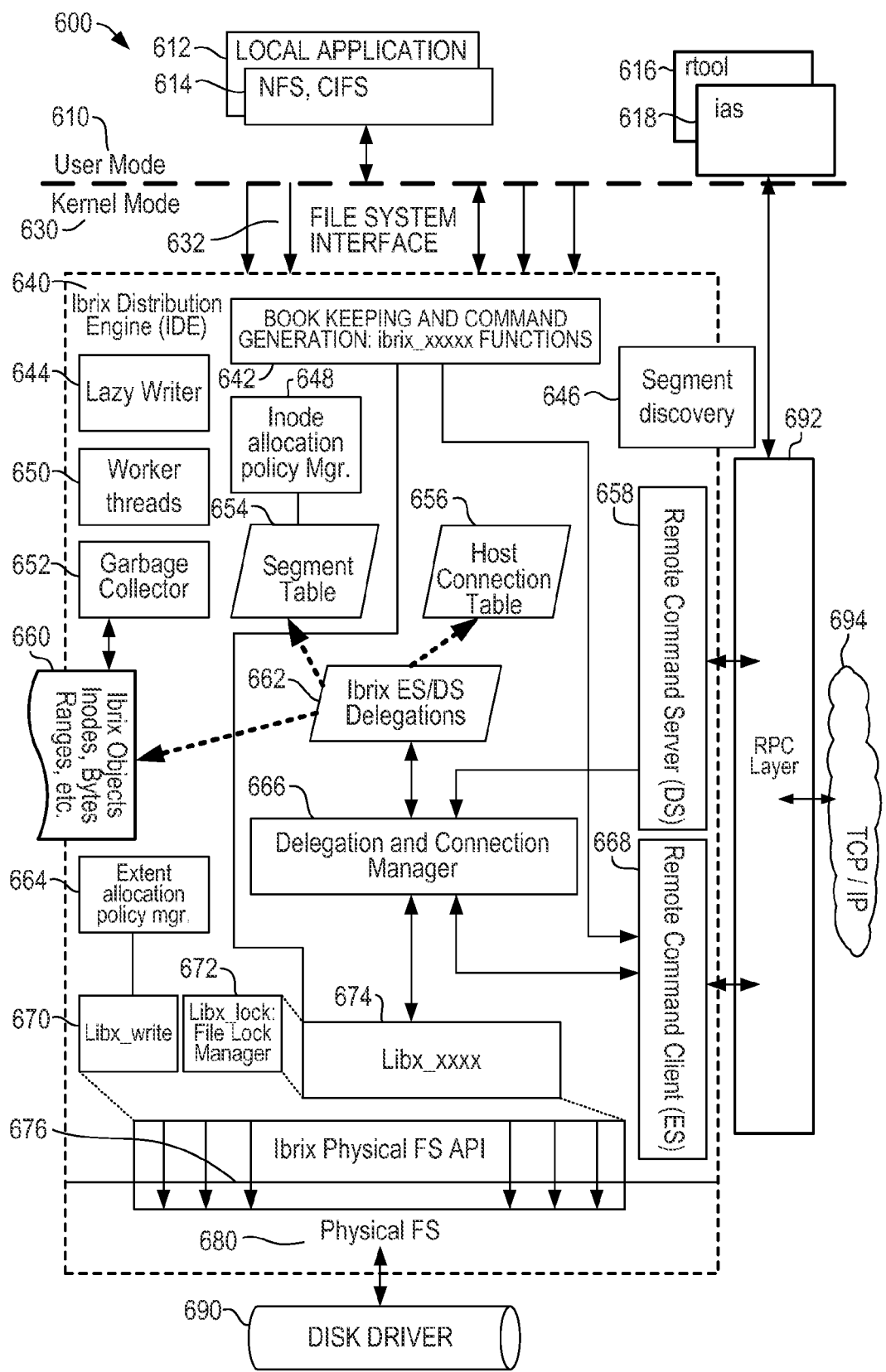
FIG. 6 is diagram of an exemplary delegation centric software component.

A block diagram of the logical interconnects between exemplary components of a segmented file system is given in FIG. 6. The description that follows below is for a specific, exemplary, preferred embodiment but the invention, including the appended claim(s), is(are) not limited to this embodiment. This example is provided for illustrative purposes, but the invention can be practiced in ways other than that described. Further, FIG. 6 illustrates interconnections and communication between pieces shown, but is not a flow diagram requiring a specific order of communications. The logical diagram in FIG. 6 can be logically subdivided into three major components:

1. User mode tools (610): SFS Administrative System ias (618), rtool (616), etc. These tools are responsible for maintaining the SFS distributed configuration including FS Nexus, User Database, controlling local SFS, getting statistics, etc.
2. The SFS Distribution Engine (IDE) (640) is at the core of the distributed segmented file system. It is responsible for maintaining network Connections between hosts running parts of the segmented file system, distributing objects, coordinating locks, etc.
3. The SFS Physical File System (680) maintains on-disk layout and supports SFS Local FS operations by exposing SFS Physical FS API (676).

The SFS Distribution Engine in turn includes the following major components:

1. Book keeping and Command Generations (642) which is an implementation of the standard File System API.
2. Lazy Writer (644)—This component is responsible for flushing data not yet committed to the disk media. Delaying execution of write requests can significantly improve performance (especially in network scenarios).
3. Inode Allocation Policy Manager (648) and Extent Allocation Policy Manager (664)—components responsible for making decisions on where to allocate new or extension inodes, files or directories.
4. Segment discovery (646)—This component is responsible for finding the File System's Segments and Hosts that own particular segments at the current time. It keeps known information in the Segment Tables (654) and Host/Connection Tables (656).
5. Worker Thread Manager (650)—This component is responsible for running background processes inside the IDE.
6. Garbage Collector (652)—This component is responsible for managing memory footprint. It takes care of freeing currently unused SFS Objects (660) when IDE desires memory, e.g., for other uses.
7. Remote Command Server (658)—This component is responsible for receiving commands from other hosts by TCP/IP network (694) through RPC layer (692) and processing these commands.
8. Remote Command client (668)—This component is responsible for sending IDE commands to other hosts and receiving and processing replies from them.
9. Every File System Object includes its delegations (662) in its representation in the IDE. Delegations for an Object exist on all Hosts interested in the Object. Each Delegation identifies an Object and defines allowed caching types for the Object on all interested parties.
10. The Delegation and Connection manager (666) is responsible for the maintenance and cancellation of delegations as well as establishing and monitoring connections to other Hosts.
11. The set of "Libx" routines (674) which include Libx_write (670) and Libx_lock (672) is responsible for accessing the SFS Physical FS (680) using SFS Physical FS API (676).

In the SFS File System, each Segment, each inode, each file, each directory, etc. preferably has an owner. The Administration System assigns Segment ownership to a particular Host and resources on that Segment belong to that owner. For resource (file, directory, inode) access, the owner of a resource is called a Destination Server (DS) and an SFS Host that wants to access the resource is called an Entry Point Server (ES). In order to get access to a resource an ES obtains a lease, or delegation, to that resource. Delegations may be used in a variety of ways in, and may provide a variety of capabilities in, a segmented file system. Various resources of a DS may be delegated to an ES. SFS Connections are maintained between ESs and DSs to help keep track of Delegations.

Figure 7:
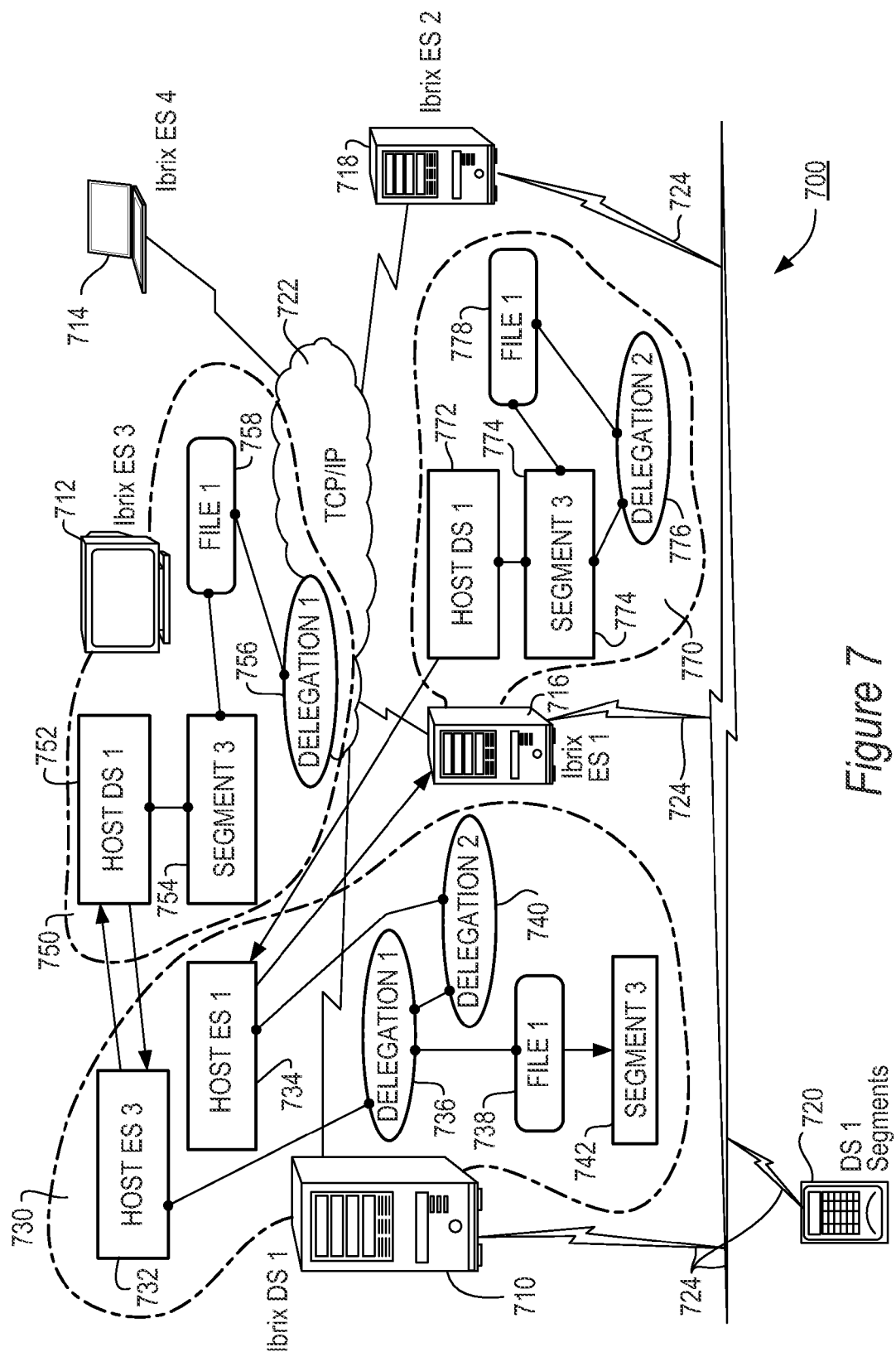
FIG. 7 is a diagram of an exemplary Host-Segment-File-Delegation relationship.

FIG. 7 (700) illustrates, for exemplary purposes, the above concepts and displays relationships between the corresponding object in the data space 730, 750, 770 of different SFS Hosts, e.g., hosts 710, 712, 714, 716, 718, of which the data spaces 730, 750, 770 correspond to the hosts 710, 712, 716 with "File 1" 738 shared by the three data spaces 730, 750, 770.

FIG. 7 displays a possible exemplary SFS configuration including 5 Hosts: SFS DS1 (710), SFS ES1 (716), SFS ES 2 (718), SFS ES 3 (712), SFS ES 4 (714). The Hosts are connected to each other by a TCP/IP network (722). The connection between corresponding Hosts are encapsulated in corresponding Host objects: Host ES 3 (732), Host ES1 (734), Host DS1 in data space of SFS ES 3 (752), and Host DS1 in data space of SFS ES1 (772). Each connection is represented by a set of two oppositely directed arrow lines. The file system in the picture resides on the disk array DS1 Segments (720) and one of the segments Segment 3 is owned and operated by the Host SFS DS1. Hosts SFS DS1 (710), SFS ES1 (716), and SFS ES1 (716) are connected to the disk array DS 1 Segments (720) by an exemplary fibre-channel network (724) comprising an exemplary SFS SAN cluster subset. This is, however, an example and other kinds of networks and disk arrays are also consistent with Delegations. Dotted lines occlude data spaces for Hosts SFS DS1 (730), SFS ES1 (770), and SFS ES 3 (750). Assume that Hosts SFS ES 1 (770) and SFS ES 3 (750) are working with the file the "File 1" that resides on Segment 3. FIG. 7 show that each of the data spaces (730, 750, 770) maintains corresponding objects for Segment 3 (742, 754, 774) and inodes for "File 1" (738, 758, 778). When Host SFS DS1 sends information about the file "File 1" to Hosts SFS ES1 and SFS ES 2 it creates corresponding delegations (736, 740) and links those delegations to the file object (738), as well as to the corresponding Host objects (732, 734). Hosts SFS ES1 and SFS ES 2 also create their corresponding objects representing delegations (756, 776) and link these objects to their representation of file "File 1" (758, 778), as well as to their representation of the Segment 3 (754, 774). Again, the discussion above provides specific, detailed, exemplary information but the invention is not limited to embodiments containing these details. As will be shown below, the ES-side record of the delegations is preferably linked at least to the Segments, and such link could be used in the process of supporting SFS Segment transfer from one Host to another.

Connections and Delegations

The descriptions below are exemplary embodiments of the implementation of Connections and Delegations and, as above, do not limit the invention, especially the claims, to require the details discussed to fall within the scope of the invention. Other embodiments should be apparent to one skilled in the art and are included as part of this disclosure. The invention provides for the possible layering of the implementation of Delegations as well as the use of Delegations in handling a variety of objects.

Network Connection

A Host Object is responsible for keeping network connection between a local host and the Host, represented by the Host Object. Different hosts may have different types of connections. A Host does not have to have a connection. If there are no active objects on all the Host's Segments, the host could be disconnected. An active object is discussed below. In case of TCP connection there is one connection per host; in case of a UDP connection, one connection could serve many hosts.

SFS Connection Management

The SFS Connection Management is typically the responsibility of the Host object. A Heart Beat (HB) mechanism may be used to maintain SFS Connections. In that case, the validity of Delegations is governed by the integrity of the Connection.

In at least one embodiment, any SFS Connection has State. The state of the SFS Connection can be defined by the state of the network connection, status of Heart Beats and State of resources that were delegated between the partners of this SFS Connection. On the ES side SFS Connection could be in one of the following states:

| | |
|---|---|
| S_NEW | SFS Connection is in the process of establishing. |
| S_HALF | SFS Connection is half-established |
| S_FRESH | established SFS Connection with regular Heart Beats. |
| S_RESET | SFS Connection with missing heart beat. This SFS Connection requires reestablishing of network connection and/or SFS Connection. |
| S_BROKEN | connection that cannot be reestablished. It requires status update from IAS. |
| S_GRACE | newly established connection that requires resetting of delegations. |

On the DS side SFS Connection could be in one of the following states:

| | |
|---|---|
| S_NEW | SFS Connection is in the process of establishing. |
| S_HALF | SFS Connection is half-established |
| S_FRESH | established SFS Connection with regular Heart Beats. |
| S_PRESERV | SFS Connection with missing heart beats but with no broken delegations. For example, this state as well as the DS-Timer may not coexist. Instead of both, every time a delegation break is about to be sent, the last receive (send) timestamps could be checked as the DS-Timer would. |
| S_STALE | SFS Connection with missing heart beats and has at least one broken delegation. |
| S_GRACE | SFS Connection is in the process of resetting delegations for one or more, e.g., all, of its segments. |

To support this functionality, the Host object may keep:
Time Stamp of the last successful send request;
Time Stamp of the last successful receive from the host;
Regularly scheduled timer to send Heart Beat requests for ES role (ES timer);
Regularly scheduled timer to check the status of the SFS Connection for DS role (DS timer);

A host's "ES timer" is responsible for sending Heart Beats to DS and receiving replies. When an ES Timer routine is called it checks the last time something has been sent to the host and decides if a heart beat should be sent. It also calculates the time interval for the next sleep. The Send method of the Host object could adjust the ES's Timer Sleep time, e.g., after every successful send. A host's "DS timer" is responsible for checking status of the SFS Connection and adjusting the state of the SFS Connection, Segments on the Host and/or Delegations. A Timer is preferably not active if the appropriate SFS Connection has not been established. In addition, the state of the SFS Connection could be adjusted, or state of every Segment on that Host (SFS Connection) or state of every Delegation could be adjusted. In some implementations, the state of every Segment should be adjusted and, when processing a Delegation, the state of the Segment should be adjusted. The list of Delegations on every Segment could be considered and the state of the Delegations adjusted so when a Delegation is used the correct state is handy.

The timer is preferably not active if the SFS Connection is not established.

SFS Connection Recovery

SFS Connection Recovery happens, e.g., in cases when something happens with the DS or with ES/DS communication. Upon Connection Recovery, a process occurs on the ES side to recover segments affected by the disconnections. This Recovery could be done in parallel for various ES and segments and results in retrieving the objects associated with active Delegations, flush of dirty data, etc.

ES Reboot or Failure

When ES reboots, there is no SFS Connection to recover. DS detects this situation when it receives an SFS_ICON-NECT request from an ES with existing SFS Connection on the DS side. In this case DS should release the delegations from that DS. Even if the ES had any exclusive delegations and kept some lock/oplocks locally, NFS and SMB clients of that ES should detect this situation. For NFS Clients it is the same as NFS Server's failure and with help of STATFS it should be detected and NFS Clients should restore their locks. The Grace period Interval should be coordinated with NFS Server's one. SMB clients will detect loss of TCP connections and proceed as with normal SMB Server failure. If there are local clients, they will not care; they will be down as well.

ES failure should be detected by IAS and its failover partner should peek up for it. The failover partner will then by request of NFS Clients, which detected NFS Server's failure, start requesting resources from DSs. The failover partner may or may not have established an SFS Connection with a DS. In any case DS will receive a request for exclusive access to a resource that original ES had exclusive delegation to. If HB interval did not expire DS will try to break the original delegation and fail. If HB interval expired, DS will set the original ES's SFS Connection STALE and remove original delegation and grant a new request. Here the DS should or could let it be known that the new ES is a failover partner of the old ES and/or that it is processing in Grace period mode for first ES's NFS Clients.

If there is no failover partner for an ES, DS will not know about ES failure until it receives a request from another ES or Local Host for a resource, delegated to a failed ES. When DS does receive this request, it breaks an existing delegation. If HB interval has expired on a Session, DS does not need to send a request to break a delegation, but preferably sets the SFS Session STALE and deletes the delegation.

If an ES failed and DS does not need to communicate to that ES, the DS will not change the state of its SFS Connection and will not release delegated resources.

Segment Recovery and Segment Reassignment

The actual process of Segment Recovery or Segment Reassignment happens on a DS, while processing of restoring the state is driven by ESs. Segment Recovery and Segment Reassignment is the same process from the ES point of view. The difference is that in case of Segment Recovery, Segment stays on the same Host, while for Segment reassignment the Segment moves with delegations from one Host to another. Segment object is a keeper of the list of Delegations, so only Segment object may be moved from one list to another.

Segment Recovery or Segment Reassignment could happen during SFS Connection recovery.

Segment Reassignment could also happen regardless of SFS Connection recovery, when IAS commands a DS to give up ownership of a segment and give it to a different Segment.

There are two ways ES could find out about Segment reassignments:
  IAS notifies an ES about Segment's change of ownership
  ES receives SFS_SEG_RELOCATED notification from a DS.

Segment reassignment/recovery could be guaranteed and non-guaranteed (Forced and non-forced) Guaranteed recovery happens if DS is within the Grace Period and it means that the restoring delegations and locks should be granted by DS. Non-guaranteed recovery happens if:
  ES failed to reassign/restore segment within Grace period time-frame. It means that the configuration is wrong and HB and Grace Period intervals should be adjusted.
  ES failed to establish Network connection with DS and SFS Connection got S_STALE.
In any case ES should:
  Find out what Segments were relocated and where, most likely by requesting IAS.
  Remove the Host object from the old Host.
  Add the Segment to its new owner Host.
  Create an SFS Connection with the new Host, if it did not exist before.
  Send SFS_START_SREASSIGNMENT command.
  Send all ES delegations (SFS_SREASS_DELEGATION). For this and following steps ES could receive errors from the DS, saying that some or all delegations could not be restored. For those delegations it should be checked if there is any state information that was violated by broken delegation (locks, oplocks). If there was a violation, those delegations are marked ERROR on the ES side and the following user request to the resources protected by those delegations should return an Error. After that the Delegation could be discarded.
  Send file locks (SFS_SREASS_LOCK) for the Inodes that did not have exclusive delegations that should allow locks to be kept. (Preferably all locks should be kept on the ES side as well as on the DS side for the purpose of restoration).
  Send SFS_END_SREASSIGNMENT.

Segment Reassignment on the DS Side

When a DS gives up ownership of a segment, it should send_SEG_RELOCATED notification to all the Sessions that have delegations on any Segment's resources. It should not break any delegations, because ESs will be able to restore all the delegations they have with the new DS owner.

When a DS receives ownership of a segment, it should set up a Grace period on this segment so that only the following SFS commands to the resources on this Segment will be accepted:
  SFS_ICONNECT;
  SFS_HEART_BEAT and this command returns S_GRACE state for the SFS Connection;
  SFS_START_SREASSIGNMENT;
  SFS_SREASS_DELEGATION;
  SFS_SREASS_LOCK;
  SFS_END_SREASSIGNMENT;

This is not the same as Grace period on a Session, because Session could have other segments and requests to other Segments should continue processing. A possible way to implement this Segments Grace period is to postpone DS processing of other above-mentioned requests to objects on the Segment. Another way is to respond with an error to those requests and make ESs to repeat these requests after Grace period. The second way could be preferred if RPC is used for communication, because RPC will retransmit and could fail request if DS will postpone it for too long. ERR_SEGGRACE could be used as a reply on conflicting requests and ESs should retry those requests after grace period interval.

Delegations

The descriptions below provide further examples of the invention, but do not exhaustively detail all possible embodiments of the invention. The descriptions below provide exemplary feature sets (definitions) of possible embodiments of the invention, including possible feature sets of Delegations. The described feature sets are not the only feature sets of Delegations, etc., that may be used in embodiments of the invention.

A Delegation is an object that defines set of rules for leasing resources from DS to ES. Resources that could be leases from a DS to an ES are called Delegatable resources. The following is a partial list of Delegatable resources:
  Inode;
  Files Byte-Range block.

Preferably every Delegatable resource keeps the list of Delegations. A resource is preferably local or remote, but not both. On DS side resource keeps list of issued Delegations. On the ES side resource keeps a list of received delegations. The ES side preferably has only one Delegation per object, although the same list could be reused and on the ES this list could have only one entry.

When an ES sends to the DS a request that requires information from a Delegatable resource to be returned, the DS considers if the resource could be leased (delegated) to the ES and what type of lease could be issued. Then this resource is sent back from the DS to the ES together with its possible corresponding delegation. Possibilities include the case when delegation NONE is issued. DS keeps an issued Delegation in the list of delegations for the resource. When ES receives a delegation it also attaches this delegation to its representation of this Delegatable resource.

Delegations typically have associated with them a sharing type. Examples of kinds of delegations are Shared, Exclusive, Notification or None:

Exclusive delegation protects both Metadata and Data. It allows ES to cache Metadata and data, modify them, keep locks and oplocks locally as well as directly read and write Data to the media, if it is visible to ES. When DS breaks Exclusive delegation, processing should be postponed until ES finishes breaking the delegation.

Shared delegation also protects both Metadata and Data. It allows ES to cache Metadata and Data and directly read Data from the media, if it is visible to ES. When DS breaks Shared delegation, processing should be postponed until ES finishes breaking the delegation.

Notification delegation preferably protects only Metadata. It preferably allows ES to cache Metadata only. It does not prevent DS from issuing exclusive or shared delegations to other ESs. When DS breaks Notification delegation, processing does not need to wait until ES finishes breaking the delegation.

None delegation does not allow ES any caching. It exists as a type of delegation so DS can send over the protocol none-existence of a delegation. None delegation is used when two different ESs are actively modifying one file to help prevent sending too many notifications. ES should contact DS every time it needs to validate an object, which has none delegation.

The DS decides what type of delegation should be issued (See: "Delegations: Case Study") below.

At any time DS can send a message and revoke delegation or possibly downgrade it from Exclusive to Shared. By receiving a revoke request, ES should sync the state for this resource to the DS, change data to stable storage (in case of write caching) and discard the read data cache for this resource.

When DS revokes an Exclusive Delegation it should postpone any usage of the protected resource until the ES replies. There should not be any timeout on the revocation request. Revoke request should be considered failed only if SFS Connection Management detected break of the SFS Connection from that ES. See SFS Connection Management and recovery for the definition of the behavior in this situation. Revoke request may entail a lot of work and network traffic on an ES part. To help avoid RPC timeouts and retransmissions, revoke request should be implemented as a set of two separate NULL-reply RPC requests: SFS_REVOKE from DS to ES and SFS_REVOKE_OK from ES to DS.

When DS revokes a shared delegation, it waits for SFS_REVOKE_OK so that the ES finishes direct media access.

Delegation has resource type. This is a type of the resource, delegation protects. Resource type defines a set of Delegation operations, which are resource dependent.

Delegations may have individual non 0 term associated with them. Such delegations are granted only for the duration of term. ES can renew them individually or just re-acquire the associated resource. Delegations with term set to 0 are renewed implicitly by the heartbeat mechanism. Any network exchange between ES and DS is treated as the heartbeat.

Delegation Object Definitions

The following provides exemplary code for implementing the feature set discussed above.

```
typedef enum_sharing_type {
    idel_non,              // No delegations are given
    idel_notify,           // Notification delegation
    idel_shared,           // Shared delegation
    idel_exclusive,        // Exclusive delegation
} SHARING_TYPE;
typedef struct_Delegation {
    void* resource;              // pointer to the resource
    Int32 res_type;              // defines the resource type
    SFSConnection *ibconn;       // pointer to the (ES/DS) connection
                                 object
    Int32 sharing:2;             // encs_exclusive, encs_shared, ...
    Int32 side:2;                // DS, ES, ...
    Int32 term;                  // may be 0
    Time expiresAt;              // may be 0, if so look up into
                                 SFSConnection
    List seglist;                // Used for adding delegation to a
                                 connection/segm
    List objlist;                // Used for linking delegations to the
                                 object
};
```

Interfaces

Following are typical external interfaces. Everything else can possibly be hidden inside of the delegation package.

```
struct Delegation_operation {
    Status (*revoke) (void* resource) ;    // delegation revoked
    Status(*notify) (void *resource);      // attributes change, no data
                                           change
    Status (*downgarde) (void* resource) ; //
};
//
// CreateDelegationDS creates an delegation on DS, checks if conflicting
// delegation exists, sends revoke messages
//
Delegation* CreateDelegationDS(
    void* resource,              // pointer to the resource
    Int32 type,                  // defines the resource type
    SFSConnection * es_conn,     // ES connection object
    Int32 sharing,               // exclusive, shared, ...
    Int32 term = 0               // default to 0. If 0, expiration is handled
                                 on es_conn
    );
//
// CreateDelegationES creates an delegation on ES after reply for
// resource is received. Note: this may not exist as an interface, it could be
// hidden into RPC description routine.
//
Delegation* CreateDelegationES(
    void* resource,              // pointer to the resource
    Int32 type,                  // defines the resource type
    Psegment seg,                // remote segment that points to
                                 connection object
    Int32 sharing,               // exclusive, shared, ...
    Int32 term = 0               // If 0
    );
//
// FreeDelegation is called when a corresponding resource is no longer
// needed on the ES or locally. If it called on ES side, it causes
// corresponding network message and triggers free_enc( ... )
// call on the DS side.
//
Status FreeDelegation(Delegation* e);
```

Delegation Usage

The following describes exemplary possible usages for delegations and provides a detailed, specific example, but not an exhaustive, limiting description of the invention. As mentioned above, two Delegatable objects are considered: inode and File Byte Range. There are three different external interfaces to a File System:

local interface through "Sys_" types of calls;
kernel nfs server interface;
samba server interface;

All three of these interfaces are communicating with a File System through vfs set of functions. But the pattern of calls is different.

Most of the "Sys_" calls start from path_walk routine. This routine walks through elements of a given path, starting from the root or from the current directory. For every element it checks caches Dentries, validating them if found in the cache, or does lookup request. After code is done using a Dentry, it issues a put request on it.

NFS request does not have a path; "path_walk" routine is preferably never used. All NFS requests start from checking a received File Handle. fh_to_dentry routine is supplied, so it is an SFS code that parses the File Handle, finds Inode number from it and then Inode itself, from the cache or by doing read_inode.

Delegations of Inodes

Operations for files or directories can be divided into four sets:

reading of inode, called Inode-Read-type operations;
reading of the file's or directory data, called Read-type operations;
modification of inode, called mode-Write-type operations;
modification or protection of file's/directory data and inode, called Write-type operations; The inode is changed whenever the file's/directory data are changed.

Symlinks are special type of files in Unix-like file systems. It is very difficult to separate inode-type operations from data-type operations for symlinks, because in most cases all symlink's data is stored inside the inode. So for symlinks only Inode-Read-type and Inode-Write-type operations are distinguished.

Inode-type operations for files and directories are the same.
Inode-Read-type operations are:
read_inode;
getattr;
revalidate;
poll;
Inode-Write-type operations are:
release (close);—changes timestamps at least
setattr; (that doesn't include file-size change)

The following table shows how different sharing types are applied to Inode delegation.

|  | Metadata | Data |
| --- | --- | --- |
| Notification | + |  |
| Shared | + | + |
| Exclusive | + | + |

Problems:
1. There are some attributes, which can be changed without affecting files Data. They are link number, ownership, mode possibly extended attributes. Breaking a shared or exclusive delegation on a File can be overkill if number of links has changed.
2. For directory caching ES keeps two different things: Read_dir cache and d_entry cache. For directory changes, Read_dir cache is invalidated. At the same time it is desired to have a solution that would allow keeping of d_entry cache. There are three different ways the directory can change:

Entries added;
Entries removed;
Entries renamed (can be considered as a combination of above);
Adding entries change directory inode timestamps but does not need to affect directory's d_entry cache;
Removing entries change link counter on the inode itself and directory inode timestamps. It is desired to:
Update directory's attributes, invalidate read_dir buffers.
Invalidate only one particular d_entry and keep all other d_entries valid.
If there is only notification delegation on the file's inode, it is okay to break this notification delegation, but if there is Exclusive or Shared delegation on file's inode, it is desirable to update attributes without breaking delegations.

Proposed Solution:
1. For files and directories protected by Shared and Exclusive delegations, an attribute-change notification is provided from DS to ES with new attributes in the message.
2. Break of Notification Delegation for both files and directories invalidates both inode and, preferably all, d_entries inode is attached to.
3. On attribute-change notification on a file ES can check if link counter has changed. If it did, it invalidates (preferably all) d_entries this inode is linked to.
4. Breaking Sharing Delegation on a Directory invalidated read_dir buffers and by itself does not invalidate d_entries.
5. When something is added to or removed from the directory Shared Delegation on a directory is preferably broken.
6. When attributes unrelated to directory entries change, preferably Notification Delegation is broken or attribute-change notification is sent if there is a Shared delegation.

DS Side

DS creates an in memory representation of Inode when it receives Inode-type operation by request of local Host or an ES. Any Data-type operation to inode or directory is presided over by Inode-type operation. DS keeps track of the Inode usage. This is done with help of delegations.

When an in-memory presentation is created on the DS side, a corresponding delegation is created and is attached to this inode. Delegation contains a pointer to the SFS Connection that delegation is given to. In case of local usage, this pointer is NULL. When a delegation is created, what sharing type to give with this delegation should be decided. There could be different strategies for making this decision. The Decision making algorithm is preferably encapsulated into a special routine. A more sophisticated algorithm could be implemented that takes into consideration access pattern history, configuration factors, type of files, etc.

A simpler algorithm can be used that takes into consideration only other existing shares and type of the request.

File Inodes:
  Read-type operations are:
  llseek;
  read;
  Some of ioctl operations;
  some of mmap operations (read);
  open (possibly contains access mode that could help to determine future access type).
  Release (close)
  ready;
  Write-type operations are:
  create
  write;
  some of ioctl operations;
  some of mmap operations (write related)
  flush
  fsync;
  fasync;
  setattr (for file size change);
  truncate;
  lock;
  oplock;
  writev;
  sendpage;
  possibly get unmapped area
1. For the first Inode-Read-type or Inode-Write-type request for the file inode DS will return an Inode with Exclusive delegation;
2. For subsequent Inode-Read-type requests from a different ES or from Local Host to the same file inode DS will give Notification delegation without breaking the first delegation;
3. For subsequent Read-type requests from the owner of Exclusive delegation, no changes in the Delegations occur.
4. For subsequent Read-type requests for this file's inode from others then owner of Exclusive delegation, DS will first try to downgrade the first (Exclusive) delegation to Notification delegation. During this downgrade process first ES requester could send us separate requests to:
  Change file attributes.
  Data to write to the file.
  Locks and oplocks (Linux leases) to apply to the file.
  Possibly other write-type operations.
  In case of receiving any of these requests from the ES, Exclusive delegation is broken and DS will reply back giving a Shared delegation. This indicates that the original Exclusive delegation was in fact downgraded to Shared and not Notification delegation.
  Read request and any other requests for this inode, except requests from the owner of exclusive delegation should wait until delegation downgrade is complete. When the process of downgrading the delegation is complete, processing the read request continues. If any shared delegation is given to anybody at this moment, this requester will get a Shared delegation. Otherwise it will be given an Exclusive delegation. The requester should typically already own a notification delegation, so a new delegation need not be produced, but the type of existing delegation is updated to decided type. Even with an NFS client read request, SFS will typically first process fh_to_dentry request that will read the inode and receive a delegation from the DS.
5. For other subsequent Read-type requests from other ES's (or local host), DS should not have any exclusive delegations, so a shared delegation is given to the new requester without breaking any existing delegations.
6. For a subsequent Write-type or Inode-Write-type request, DS should first break the existing delegations, including Exclusive, Shared and Notification. If request came from the owner of the Exclusive delegation, his delegation need not be broken, but the other notifications are broken. Shared delegations are not supposed to exist if there was an Exclusive delegation. During this break process the owner of exclusive delegation that is broken could send separate requests to:
  Change file attributes.
  Data to write to the file.
  Locks and oplocks (Linux leases) to apply to the file.
  In this case DS will not return shared delegation in reply, but it should mark to itself, that there was a "real" exclusive delegation broken. DS will give exclusive delegation to the ES requesting Write-type of request if:
  There are no exclusive or shared delegations; OR
  There are no shared delegations and in the process of breaking an exclusive delegation the file has not been modified;
  And there are no locks, oplocks or Byte Ranges on this file;
  DS will give a None delegation if there are locks, oplocks or Byte Ranges on this file. Otherwise a Shared delegation is given.
  The original request and the other requests from everybody but the owner of exclusive delegation should wait until exclusive and/or shared delegations are broken. DS do not need to wait for finishing breaking notification delegations.
7. At any moment ES can send a request to release its delegation.
8. All sequence of operations can start from an Inode-Write-type request. It happens when a remote Inode is created. It should be a rare case, but still could happen. In this case DS also given as Exclusive delegation.

Directory Inodes:
  Exemplary Read-type operations are:
  readdir;
  lookup;
  some of ioctl operations;
  Some of ioctl operations;
  follow_link.

Exemplary Write-type operations are:
  create
  mkdir;
  rmdir;
  mknod;
  link;
  unlink;
  symlink;
  rename;
  lock;
  oplock;
1. For the first and the subsequent Inode-Read-type request for a directory's Inode, DS will return this Inode with Notification delegation;
2. For subsequent Read-type requests for this directory's inode, DS will give a Shared delegation, which should substitute a Notification delegation, if it was already issued to the same ES before. ES should also remove an old Notification Delegation and save a newly received one. DS keeps Notification delegations from other ESs for the same directory Inode
3. For subsequent Write-type or Inode-Write-type requests for this directory inode, DS should break existing delegations, Shared and Notification. It should wait for Shared notifications to be broken before proceeding with processing of this request. DS does not need to wait for Notification Delegations to be broken. The other requests to this directory should wait until DS finish processing this request.

4. At any moment ES can send a request to release its delegation.

Exclusive delegations may not be given to directories. Directory changes should occur on the DS side.

Symbolic Link Inodes

For symbolic links Inode-Read-type operations also include the following:
readlink;
follow-link Write operations on Symlinks exist in form of operations on directory. For symbolic links, there may only be Notification delegations.

ES Side

ES creates an in memory representation of an Inode when it receives Inode-type operation by request of local Host. It knows that the Inode doesn't belong to a local Segment. It means that the Host (SFS Connection) represents an ES for this Inode. ES always creates an in memory representation for all remote Inodes. There are several vfs requests during processing of those Inode can be created. Lookup and fh_to_dentry calls are supposed to create Inode structure for an existing Inode. They both use iget4 helper function in the Linux kernel that in turn calls read_inode vfs function in SFS. Functions create, mkdir, symlink create a new inode. They use Linux helper functions new_inode or get_empty_inode and fill in this inode by themselves. All these functions make corresponding calls to a DS and receive a corresponding delegation in the reply.

When an in-memory presentation is created on the DS side, a corresponding delegation is created and it is attached to this inode. Delegation contains a pointer to the SFS Connection that delegation is associated with. In case of local usage, this pointer is NULL. When a delegation is created, is should be decided what sharing type to give with this delegation. There could be different strategies for making this decision. The Decision making algorithm should be encapsulated into a special routine. A more sophisticated algorithm could be implemented that takes into consideration access pattern history, configuration factors, type of files, etc.

A simpler algorithm can be used that takes into consideration only other existing shares and type of the request.

Inode delegations are shared delegations. When an inode is originated on the DS side, a corresponding delegation is created:

inode->delegation=CreateDelegationDS(inode,
ENCT_NODE, es_connection, encs_shared, 0);

This means: create an inode delegation, for the es (if NULL, for local use); the delegation is validated by the heartbeat.

When inode is changed on the DS side on behalf of the ES, a call to CreateDelegationDS is made again:

inode->delegation=CreateDelegationDS(inode,
ENCT_NODE, es_connection, encs_shared revoke, 0);

This time sharing parameter is set to encs_shared revoke, which causes revocation of, preferably all, conflicting delegations (but typically not the delegation for the originating ES).

When the inode is no more needed on the ES, a call to FreeDelegation is made. It triggers a free_enc( ) call on the DS.

Delegations: A Case Study

Assume a scenario involving a DS and 2 ES's—ES1 and ES2. Here for the simplicity reasons, 'open' is used as an example of the operation that may be delegated from the DS to ES. In fact, the operation could be any other delegatable operation on an inode.

ES1 performs readdir_plus (1s–1) type of operation retrieving file names and files attributes on a directory owned by the DS. To do that ES1 issues read_inode requests for every file in the directory. Assume a file from this directory was never requested by any ES and is not opened locally on DS—there is no delegation associated with it. In this case, DS may grant exclusive delegation to be sent to ES1.

Now when ES1 gets a request to open the file, set up a lease (oplock), set a lock or flock, it can do this without further communicating with DS. Assume that ES2 (other ES) also wants to read directory information and get file attributes. It also will issue read_inode request to the DS. However, this time the DS detects that most of the files have exclusive delegations assigned to ES1 and will grant notification delegation to the ES2. Note: exclusive delegation granted to ES1 is not broken.

Assume an application on the ES2 wants to open a file different from the file opened by the ES1. Since ES2 does not have the exclusive delegation to the inode, it will send open request to the DS. To execute this open request, DS has to revoke exclusive delegation it granted to the ES1. Since ES1 has no interest in this file it simply releases the delegation. When DS recognizes that inode is free (no delegations or local usage) it grants the exclusive delegation to the ES2. Now ES2 can re-execute open and perform other operations locally.

And, finally, assume ES2 wants to open the file delegate and used by ES1. Similar to the case above, ES2 does not have the exclusive delegation to the inode, it will send open request to the DS. To execute this open request, DS revokes exclusive delegation it granted to the ES1. However, now ES1 has objects that are protected by this delegation and before (or together with) releasing the delegation it sends these objects to the DS. DS can look into the type of objects it received from ES1 and then can grant both ES1 and ES2 shared delegations, no delegations at all (or notification delegation), and start serving this file itself.

Figure 8A:
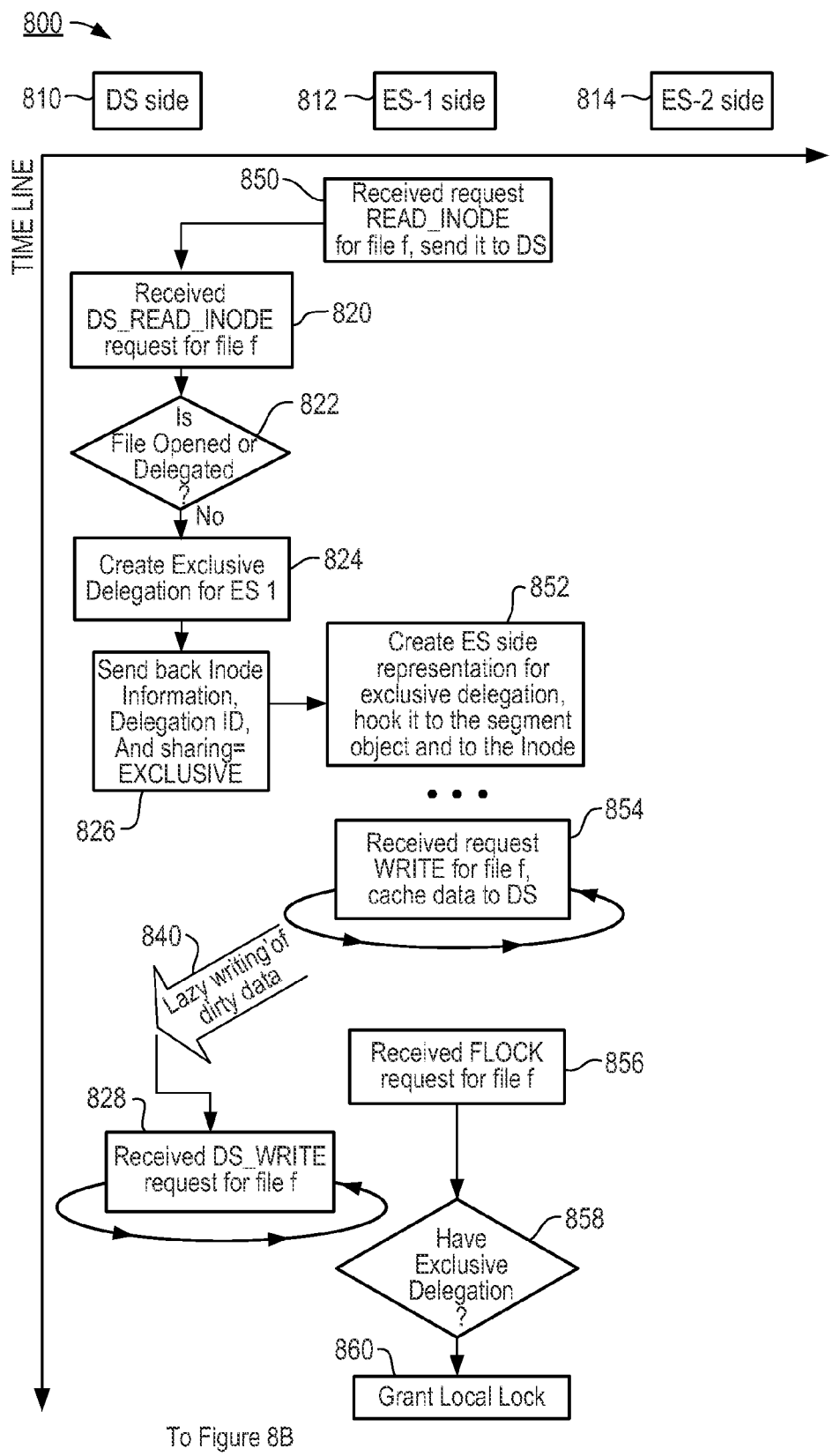
FIGS. 8A-8B are a diagram of an example of the history of a delegation lifespan including its creation and revocation.
Figure 8B:
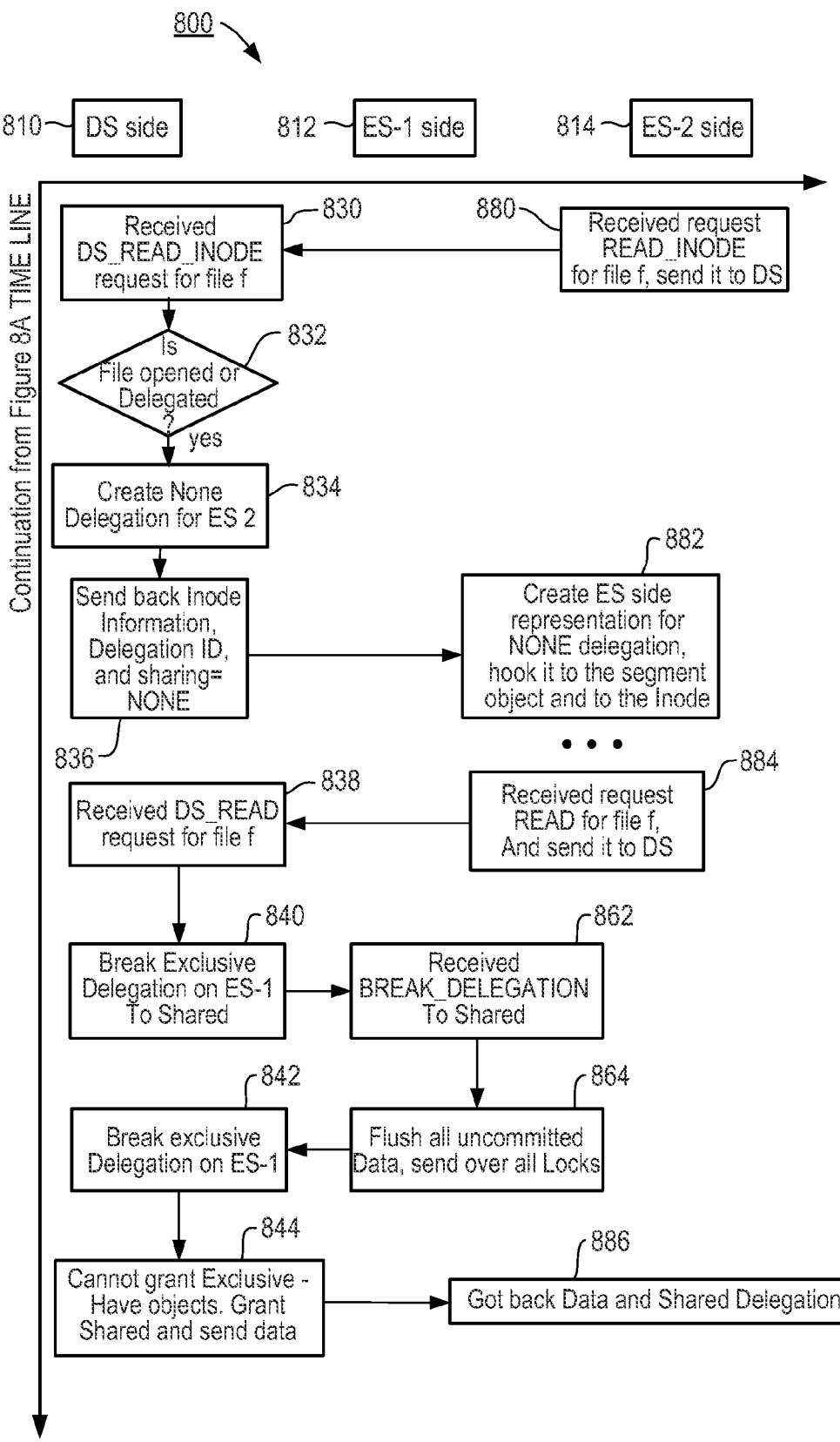

Another exemplary scenario is depicted in FIGS. 8A-8B entitled "Example of Delegation Life Span (800)." This provides an example only, and not an exhaustive, limiting description of the invention, or delegation of life span according to the invention. This example involves 3 SFS Hosts: DS (810) and 2 ES's—ES-1 (812) and ES-2 (814). Events and decisions are shown in their relative sequence on a time line progressing from top of the example to the bottom.

Assume ES-1 received a request to READ_INODE for file f (850) and sends it to DS.

DS received DS_READ_INODE request for file f (820). It checks if file f is opened or already delegated (822). Assume that it is not. In this case DS, creates an exclusive delegation for ES-1 (824) and replies with information for the requested inode and delegation, including sharing type and delegation ID (826). ES-1 receives a reply, creates a representation for this exclusive delegation, and hooks it to the Segment object and inode (852). Some time later ES-2 gets a write request for file f. Since it already has an exclusive delegation for this file, it does not have to send data to DS right away and can safely cache dirty pages on its side. Write requests are still coming in, data gets cached, and a Lazy Writer efficiently pushes data to the DS side (854). Assume ES-1 also gets some lock requests (856). Since it already has an exclusive delegation for this file (858), it does not have to send this request to the DS side and can process local locks itself (860).

Meanwhile ES-2 also receives a READ_INODE request and sends it to DS (880). DS receives DS_READ_INODE request for file f (830) and checks if the file is delegated (832). Now the file has exclusive delegation, so DS creates a None delegation (834) and sends data to ES-2 (836). ES-2 receives a reply, creates a representation for this exclusive delegation, and hooks it to the Segment object and inode (882). Some time later, ES-2 receives a READ request and sends it to DS (884). DS receives a DS_READ request (838) and sends a break exclusive-to-shared for the delegation granted to ES-1 (840). ES-1 receives a BREAK_DELEGATION up-call (862), flushes dirty pages and local locks to DS (864). Now DS knows that ES-1 is actively writing file f, plus to maintain locks for ES-1, so it issues a Shared delegation for ES-2 and sends it back together with the requested data (844). As time passes by, DS knows if ES-2 is active or not. If not, it can reissue an exclusive delegation to ES-1 effectively allowing it start caching again.

Other embodiments are within the scope of the invention.

What is claimed is:

1. A system for implementing a distributed, segmented file system, the system comprising:
   a plurality of file servers that each are configured to control separate segments of the distributed-file system, the file servers being configured to:
   communicate with a memory storing at least one of the segments of the distributed file system; and
   control, read, and write to file system objects stored in the memory;
   means for transferring permission for access to a requested file system object, in response to an access request, from a first file server currently controlling a segment where the requested file system object resides to a second file server; and
   means for caching the requested file system object at the second file server in response to receiving an indication, from the means for transferring, of transferred permission to access the requested file system object.

2. The system of claim 1 wherein the transferring means is configured to provide an indication related to an identity of the requested file system object.

3. The system of claim 2 wherein the plurality of servers are configured to determine from the indication a current state of access permission of the requested file system object.

4. The system of claim 3 wherein the current state includes a current file server that has control of the requested file system object.

5. The system of claim 1 wherein the file system object is one of a file and a byte range.

6. The system of claim 1 wherein the first server currently controlling the segment where the requested object resides and the second server are the same server.

7. The system of claim 1 wherein the means for transferring permissions is configured to transfer permissions without affecting the distributed file system.

8. The system of claim 1 wherein the means for transferring includes means for modifying the permission for access, to the requested file system object, for the second file server.

9. The system of claim 8 wherein the means for modifying is configured to grant shared access to the file system object and to send a modified permission indication the second file server in response to receiving another access request for the requested file system object.

10. The system of claim 9 wherein the means for modifying is configured to adjust a level of permission of the second file server based on a present level of permission of the second file server and a type of access requested by the another access request.

11. The system of claim 10 wherein the adjusted level of permission of the second file server is a shared access level, and a third file server that requested the another access request is also granted the shared access level.

12. The system of claim 8 wherein the means for modifying is configured to send a rescinded permission indication to the second file server, and the means for caching is configured to discontinue use of the cached file system object in response to receiving the rescinded permission indication.

13. The system of claim 12 wherein the means for modifying is configured to send the rescinded permission indication in response to receiving a request from another file server to write to the file system object.

14. A computer program product for use in a file server of a distributed, segmented single file system implemented by a plurality of file servers that control metadata of separate segments of the single file system, the single file system including file system objects residing in the segments and comprising at least portions of one of files and directories, the computer program product residing on a computer-readable medium and comprising computer-readable instructions for causing a computer to:
   receive a request for access to a file system object stored in a segment controlled by a first file server, the request for access being associated with a second file server;
   determine a level of permission for access to the file system object currently granted to at least one other file server;
   send an indication of permission to access the file system object toward the second file server, wherein a level of permission granted by the indication of permission is determined based on the level of permission currently granted to the other file server; and
   modify the level of permission granted to the other file server in response to receiving the request for access.

15. The computer program product of claim 14 wherein the instructions are configured to cause the computer to grant shared access to the file system object and to send a modified permission indication to the other file server in response to receiving the access request for the requested file system object.

16. The computer program product of claim 15 wherein the instructions are configured to cause the computer to adjust a level of permission of the other file server based on a present level of permission of the other file server and a type of access requested by the received access request.

17. The computer program product of claim 16 wherein the adjusted level of permission of the other file server is a shared access level, and the second file server is also granted the shared access level.

18. The computer program product of claim 8 wherein the instructions are configured to cause the computer to send a rescinded permission indication to the other file server to cause the other file server to discontinue use of a cached version of the file system object in response to receiving the rescinded permission indication.

19. The computer program product of claim 18, wherein the instructions are configured to cause the computer to send the rescinded permission indication in response to receiving a request to write to the file system object.

20. The system of claim 1 further comprising:
   means for caching the requested file system object at the second file server in response to receiving an indication, from the means for transferring, of transferred permission to access the requested file system object.

* * * * *